(12) United States Patent
Küng et al.

(10) Patent No.: US 11,029,182 B2
(45) Date of Patent: Jun. 8, 2021

(54) MAGNETIC-INDUCTIVE FLOWMETER AND METHOD FOR MEASURING THE FLOW VELOCITY OF LOW CONDUCTIVITY MEDIA WITH A NARROWING MEASURING TUBE AND A FIELD GUIDE-BACK DEVICE

(71) Applicant: Endress+Hauser Flowtec AG, Reinach (CH)

(72) Inventors: Thomas Küng, Münchenstein (CH); Günther Bähr, Therwil (CH); Frank Voigt, Weil am Rhein (DE)

(73) Assignee: Endress+Hauser Flowtec AG, Reinach (CH)

( * ) Notice: Subject to any disclaimer, the term of this patent is extended or adjusted under 35 U.S.C. 154(b) by 284 days.

(21) Appl. No.: 16/317,176

(22) PCT Filed: Jun. 26, 2017

(86) PCT No.: PCT/EP2017/065697
§ 371 (c)(1),
(2) Date: Mar. 19, 2019

(87) PCT Pub. No.: WO2018/010943
PCT Pub. Date: Jan. 18, 2018

(65) Prior Publication Data
US 2019/0226890 A1     Jul. 25, 2019

(30) Foreign Application Priority Data
Jul. 12, 2016   (DE) .................. 10 2016 112 742.6

(51) Int. Cl.
*G01F 1/58*     (2006.01)
*G01F 15/00*   (2006.01)
*G01F 22/00*   (2006.01)

(52) U.S. Cl.
CPC ............... *G01F 1/588* (2013.01); *G01F 1/58* (2013.01); *G01F 1/586* (2013.01); *G01F 15/005* (2013.01); *G01F 22/00* (2013.01)

(58) Field of Classification Search
None
See application file for complete search history.

(56) References Cited

U.S. PATENT DOCUMENTS

| 3,406,569 A | 10/1968 | Rohmann | |
| 3,827,461 A * | 8/1974 | Gilman | G01F 15/00 138/39 |

(Continued)

FOREIGN PATENT DOCUMENTS

| CN | 1896696 A | 1/2007 |
| CN | 103292853 A | 9/2013 |

(Continued)

OTHER PUBLICATIONS

Search Report for German Patent Application No. 10 2016 112 742.6, German Patent Office, dated Mar. 28, 2017, 10 pp.

(Continued)

*Primary Examiner* — Harshad R Patel
(74) *Attorney, Agent, or Firm* — Christopher R. Powers; Endress+Hauser (USA) Holding Inc.

(57) ABSTRACT

The present disclosure relates to a method for measuring flow velocity or volume flow of a medium using a magneto inductive flow measuring device and to an arrangement having a magneto inductive flow measuring device, as well as to a filling plant with an arrangement, wherein the medium has a low conductivity. A high accuracy of measurement is achieved by provision of a first narrowing of a medium-containing pipeline and/or a second narrowing of a (Continued)

medium-containing measuring tube, wherein the pipeline leads the medium to a measuring tube of the flow measuring device.

21 Claims, 4 Drawing Sheets

(56) References Cited

U.S. PATENT DOCUMENTS

| | | | | |
|---|---|---|---|---|
| 5,691,484 A * | 11/1997 | Feller | ............... | G01F 1/584 |
| | | | | 73/861.13 |
| 2006/0144161 A1* | 7/2006 | Heijnsdijk | ............... | G01F 1/584 |
| | | | | 73/861.12 |
| 2008/0110281 A1* | 5/2008 | Sanders | ............... | G01F 1/44 |
| | | | | 73/861.63 |
| 2009/0173168 A1 | 7/2009 | Cottam et al. | | |
| 2009/0217771 A1* | 9/2009 | Hoecker | ............... | G01F 1/3209 |
| | | | | 73/861.22 |
| 2009/0301218 A1* | 12/2009 | Budmiger | ............... | G01F 1/60 |
| | | | | 73/861.12 |
| 2009/0326839 A1* | 12/2009 | Rogers | ............... | G01F 1/44 |
| | | | | 702/47 |
| 2012/0304780 A1* | 12/2012 | Walbrecker | ............... | G01F 1/58 |
| | | | | 73/861.12 |
| 2014/0132260 A1* | 5/2014 | Hogendoorn | ............... | G01F 1/74 |
| | | | | 324/306 |
| 2014/0150567 A1* | 6/2014 | Voigt | ............... | H05K 13/00 |
| | | | | 73/861.11 |
| 2014/0260666 A1* | 9/2014 | Brand | ............... | G01F 1/32 |
| | | | | 73/861.22 |
| 2017/0146377 A1* | 5/2017 | Budmiger | ............... | G01F 1/60 |

FOREIGN PATENT DOCUMENTS

| | | |
|---|---|---|
| CN | 206488822 U | 9/2017 |
| DE | 10312058 A1 | 9/2004 |
| DE | 102007038895 A1 | 5/2008 |
| DE | 102008016296 A1 | 10/2009 |
| DE | 202012104036 U1 | 1/2014 |
| DE | 102012110665 A1 | 5/2014 |
| DE | 102015107366 B3 | 1/2016 |
| DE | 102015112930 A1 | 2/2017 |
| EP | 1106974 A1 | 6/2001 |
| JP | 59180437 | 10/1984 |
| JP | 2001056242 A | 2/2001 |
| JP | 2001241981 A | 9/2001 |
| WO | 2009158605 A1 | 12/2009 |

OTHER PUBLICATIONS

Search Report for International Patent Application No. PCT/EP2017/065697, WIPO, dated Jun. 26, 2017, 15 pp.

Rose, Charles and Vass, Gabor E., New Developments in Flow Measurements; Magmeters for Partially-Filled Pipelines, XP000622540, ISA, 1994, pp. 199-224.

* cited by examiner

MAGNETIC-INDUCTIVE FLOWMETER AND METHOD FOR MEASURING THE FLOW VELOCITY OF LOW CONDUCTIVITY MEDIA WITH A NARROWING MEASURING TUBE AND A FIELD GUIDE-BACK DEVICE

CROSS-REFERENCE TO RELATED APPLICATIONS

The present application is related to and claims the priority benefit of German Patent Application No. 10 2016 112 742.6, filed on Jul. 12, 2016 and International Patent Application No. PCT/EP2017/065697 filed on Jun. 26, 2017, the entire contents of which are incorporated herein by reference.

TECHNICAL FIELD

The invention relates to a method for operating a magneto inductive flow measuring device for measuring flow velocity or volume flow of a medium in a measuring tube and to a magneto inductive flow measuring device.

BACKGROUND

Magneto inductive flow measuring devices have been applied for a long time for flow measurement and have proven themselves effective for the task. The principle of magneto inductive flow measurement is based on the inducing of flow dependent, electrical voltage in a conductive medium flowing through a pipeline caused by a magnetic field oriented perpendicularly to the flow direction. The magnetic field is usually produced by a coil system having one or more coils. The flow dependent voltage is tapped by at least two measuring electrodes and evaluated by a measuring apparatus. Thus, from the measured voltage and the known magnetic field, the flow velocity of the medium through the pipeline can be determined. DE10312058A1 describes such a flow measuring device.

Magneto inductive measuring devices are robust and favorably manufactured flow measuring devices but need for successful measurement operation a minimum electrical conductivity of the medium to be measured. In the case of low conductivity of the medium, the impedance of the medium increases and signal quality decreases, so that, in such case, flow measuring devices operating based on other measuring principles tend to be used.

SUMMARY

An object of the invention is, consequently, to provide a method for measuring flow velocity or volume flow of a medium by means of a magneto inductive flow measuring device and a magneto inductive flow measuring device to perform the method, in the case of which media with small conductivities can be reliably measured with high accuracy.

The object of the invention is achieved by a method, as well as by a magneto inductive flow measuring device, as well as by an arrangement for measuring flow velocity or volume flow of a medium by means of the magneto inductive flow measuring device of the present disclosure.

The method of the invention is practiced by means of a magneto inductive flow measuring device having a magnet system with at least a first coil system, at least two measuring electrodes and a measuring tube, wherein the at least a first coil system produces a magnetic field extending essentially perpendicularly to a longitudinal axis of the measuring tube for inducing a flow dependent voltage in the medium;

wherein the at least two measuring electrodes coupled with the medium register the voltage induced in the medium by the magnetic field;

wherein the medium is led via a pipeline to the measuring tube of the magneto inductive measuring device;

wherein the pipeline has a first narrowing and/or the measuring tube has a second narrowing, which are/is arranged on the upstream side of the flow measuring device, and wherein the medium is a liquid with an electrical conductivity of at most 20 µS/cm and especially at most 5 µS/cm and preferably at most 2 µS/cm, wherein the medium of the invention can be a medium from the following list:

demineralized water, mixture of demineralized water and at least one hydrocarbon, mixture of demineralized water and at least one alcohol, mixture of demineralized water and at least one organic compound, e.g. a vitamin or an amino acid, mixture of demineralized water and at least one enzyme, mixture of demineralized water and at least one additional component, which does not increase the conductivity above the above, at most values.

In an embodiment of the method, the first narrowing decreases an inner cross-sectional area of the pipeline and/or the second narrowing decreases an inner cross-sectional area of the measuring tube by at least 10% and especially by at least 30% and preferably by at least 50%.

In an embodiment of the method, the ratio, volume flow in ml/s to inner cross sectional area of the pipeline in $mm^2$, is greater than 0.05 ml/(s*$mm^2$) and especially greater than 0.1 ml/(s*$mm^2$) and preferably greater than 0.5 ml/(s*$mm^2$) and less than 20 ml/(s*$mm^2$) and especially less than 10 ml/(s*$mm^2$) and preferably less than 5 ml/(s*$mm^2$).

In an embodiment of the method, the pipeline has an essentially round cross-section, wherein the radius of the pipeline is greater than 1 mm and especially greater than 2 mm and preferably greater than 5 mm and less than 50 mm and especially less than 35 mm and preferably less than 27 mm.

In an embodiment of the method, the path length in the direction of flow of the medium from the beginning of the first narrowing to the measuring electrodes is at most 40 times and especially at most 20 times and preferably at most 10 times the inner diameter of the measuring tube in the region of the measuring electrodes.

In an embodiment of the method, in a measuring phase, an essentially constant magnetic field is produced for registering at least one voltage value for determining flow velocity or volume flow, wherein the magnetic field is periodically switched between different field states, especially the polarity is changed, wherein the frequency of state change is greater than 80 Hz and especially greater than 120 Hz and preferably greater than 200 Hz, wherein a higher frequency of state change influences the signal-noise ratio of the induced voltage registered by the measuring electrodes positively.

A magneto inductive flow measuring device of the invention for measuring flow velocity or volume flow of a medium in a tube or pipeline comprises, in such case:

a measuring tube having a first longitudinal axis;

a magnet system having at least a first coil system having at least a first coil with a first coil core, wherein the first coil system is arranged on the measuring tube, wherein the first coil system is adapted to produce a magnetic field extending essentially perpendicularly to a first longitudinal axis of the measuring tube;

arranged in the measuring tube, at least two measuring electrodes, which are coupled with the medium and adapted to register a flow dependent voltage induced in the medium by the magnetic field; and an electronic measuring/operating circuit, which is adapted to evaluate the voltage registered by the measuring electrodes;

wherein the magnet system includes at least one field guide-back adapted at least partially to lead the magnetic field away from the measuring tube between the measuring tube side lying opposite the first coil system and the first coil system, wherein the field guide-back includes two guide-back sheet metal pieces, which are arranged on oppositely lying sides of the measuring tube and wherein the first coil core is adapted at least partially to lead the magnetic field between the measuring tube and the field guide-back and to increase the magnetic flux density in the coil system, wherein the guide-back sheet metal pieces are separated from one another by an air gap.

The separating of the guide-back sheet metal pieces by an air gap leads to a faster settling of the electrical voltage induced in the medium by the magnetic field in the case of changing from a first field state to a second field state. In this way, the frequency of state change of the magnetic field can be increased, which influences the signal-noise ratio of the induced voltage registered by the measuring electrodes positively.

In an embodiment of the magneto inductive flow measuring device, the air gap assures a separation of the guide-back sheet metal pieces from one another, wherein the ratio of separation to wall thickness of the guide-back sheet metal is greater than 0.5 and especially greater than 1 and preferably greater than 1.5.

In an embodiment of the magneto inductive flow measuring device, the guide-back sheet metal pieces are symmetric relative to a plane, in which the first longitudinal axis extends.

In an embodiment of the magneto inductive flow measuring device, the at least one coil of the first coil system has a second longitudinal axis, wherein the air gap intersects the second longitudinal axis, especially perpendicularly. The second longitudinal axis coincides, in such case, with a symmetry axis of the coil, wherein the flow measuring device has on the side lying opposite the first coil system at least a second coil system with at least a second coil having a second coil core, especially a second coil system constructed equally to the first coil system, wherein the first coil system and the second coil system are adapted to produce a magnetic field extending essentially perpendicularly to the first longitudinal axis of the measuring tube and essentially in parallel with the second longitudinal axis of the first coil system, wherein the second coil core is adapted to lead the magnetic field between the measuring tube and the field guide-back and to increase the magnetic flux density in the coil system, and wherein the field guide-back is adapted at least partially to lead the magnetic field away from the measuring tube between the first coil system and the second coil system.

In an embodiment of the magneto inductive flow measuring device, the electronic measuring/operating circuit is adapted to supply the coil system with electrical current, in order in a measuring phase to produce an essentially constant magnetic field for registering at least one voltage value for determining flow velocity or volume flow, wherein the electronic measuring/operating circuit is, furthermore, adapted to switch the magnetic field periodically between different field states, and especially to change the polarity, wherein frequency of change of the field state is greater than 80 Hz and especially greater than 120 Hz and preferably greater than 200 Hz.

Increasing the frequency of state change improves the signal-noise ratio. With the provision of an air gap between the field guide-back sheet metal pieces, the faster adjusting of the electrical voltage induced in the medium by the magnetic field to a changed magnetic field allows the state change frequency to be further increased and, thus, the signal-noise ratio to be further improved.

An arrangement of the invention includes, in such case:
at least one pipeline; and
at least one magneto inductive flow measuring device, comprising:
a measuring tube;
a magnet system having at least a first coil system, which is adapted to produce a magnetic field extending essentially perpendicularly to a longitudinal axis of the measuring tube;
arranged in the measuring tube, at least two measuring electrodes, which are coupled with the medium, wherein the measuring electrodes are adapted to register a flow dependent voltage induced in the medium by the magnetic field; and
an electronic measuring/operating circuit, which is adapted to evaluate the voltage registered by the measuring electrodes;
wherein the medium is led via the pipeline to the measuring tube of the magneto inductive measuring device, and wherein the pipeline has a narrowing, which is arranged on the upstream side of the flow measuring device.

The narrowing of the invention includes in the pipeline or in the measuring tube a flow shedding edge, which brings about a flattening of the flow profile of the medium in the region of the measuring electrodes. A flat flow profile in the region of the measuring electrodes is advantageous for the signal-noise ratio.

In an embodiment of the arrangement, the first narrowing decreases an inner cross-sectional area of the pipeline and the second narrowing decreases an inner cross-sectional area of the measuring tube by at least 10% and especially by at least 30% and preferably by at least 50%.

In an embodiment of the arrangement, the path length along the flow direction of the medium from the beginning of the narrowing to the measuring electrodes is at most 40 times and especially at most 20 times and preferably at most 10 times the inner diameter of the narrowing.

In an embodiment of the arrangement, the electronic measuring/operating circuit is adapted to supply the coil system with electrical current, in order to produce an essentially constant magnetic field in a measuring phase for registering at least one voltage value for determining flow velocity or volume flow, wherein the electronic measuring/operating circuit is, furthermore, adapted to switch the magnetic field periodically between different field states, and especially to change the polarity, wherein frequency of change of the field state is greater than 80 Hz and especially greater than 120 Hz and preferably greater than 200 Hz.

In an embodiment, the arrangement includes an outlet, which is arranged on the downstream side of the flow measuring device, wherein the medium is led via the outlet from the flow measuring device to a container.

In an embodiment of the arrangement, the outlet includes a valve adapted to control flow velocity or volume flow of the medium through the pipeline.

In the case of a filling, or bottling, plant of the invention, a filling volume amounts to a volume of at least 10 ml and especially at least 50 ml and preferably at least 200 ml.

In an embodiment of the filling plant, a filling volume amounts to a volume of at most 10 l and especially at most 5 l and preferably at most 2 l.

In an embodiment of the filling plant, the relative deviation of the filling volume from a desired filling volume is less than 1% and especially less than 0.3% and preferably less than 0.1%.

The present invention thus provides a method for measuring flow velocity or volume flow of a medium of low conductivity by means of a magneto inductive flow measuring device as well as a magneto inductive flow measuring device for implementing the method as well as an arrangement having a magneto inductive flow measuring device for implementing the method and a filling plant having a magneto inductive flow measuring device. The combination of advantageous features including the frequency of state change of the magnetic field of at least 80 Hz, the narrowing of the pipeline or of the measuring tube for optimizing the flow profile in the region of the measuring electrodes as well as the guide-back sheet metal pieces separated by an air gap for increasing the possible frequency of state change of the magnetic field for improvement of the signal-noise ratio of the voltage tapped by the measuring electrodes in the medium enables the measuring of flow velocity and/or volume flow of a medium through a pipeline having a conductivity of at most 10 μS/cm and especially having a conductivity of at most 5 μS/cm and preferably having a conductivity of at most 3 μS/cm.

The invention will now be explained based on an example of an embodiment presented in the appended drawing, the figures of which show as follows:

DETAILED DESCRIPTION

Figure 1:
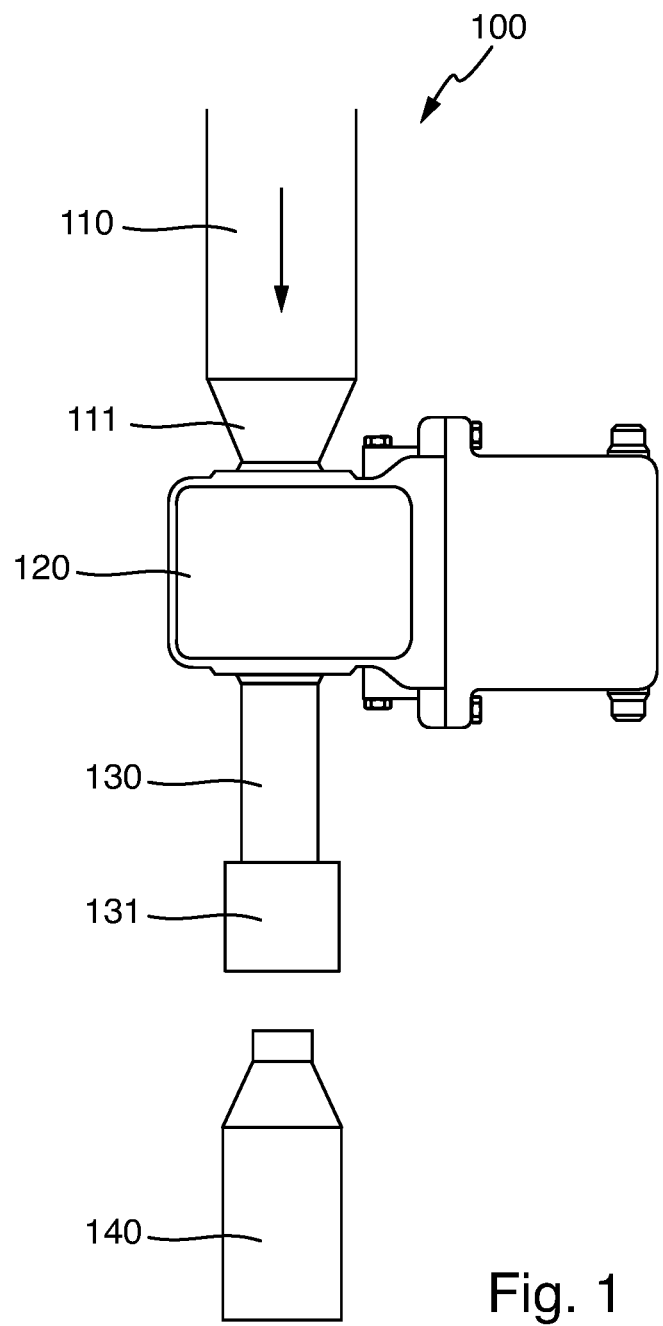
FIG. 1 shows a schematic arrangement with a pipeline of the invention and a magneto inductive flow measuring device of the invention.

FIG. 1 shows an arrangement 100 comprising a magneto inductive flow measuring device 120, a pipeline 110 having a first narrowing 111, and an outlet 130 having a valve 131, as well as a container 140. A medium, which flows through the pipeline 110 to the flow measuring device 120, experiences an increased flow velocity as a result of the first narrowing 111. For example, the pipeline has a first narrowing 111, in which the tube cross section decreases continuously in the downstream direction, such that the flow resistance increases, but less than in the case of an abrupt narrowing. In the case of laminar flows, whose Reynolds number R lies in the vicinity of a critical value $R_{Krit}$, in the case of which a transition to turbulent flow can be observed, the downstream end of the narrowing 111 acts as a flow shedding edge, which effects a forming and shedding of flow vortices. In the case of laminar flows, the flow profile has, to a good approximation, a parabolic form, such that the flow velocity on the wall of the pipeline 110 is practically 0 and centrally maximum along a longitudinal axis of the pipeline 110. The flow vortices influence a boundary layer, which in the case of measuring electrodes forms at the interface, electrode material—medium.

Figure 2:
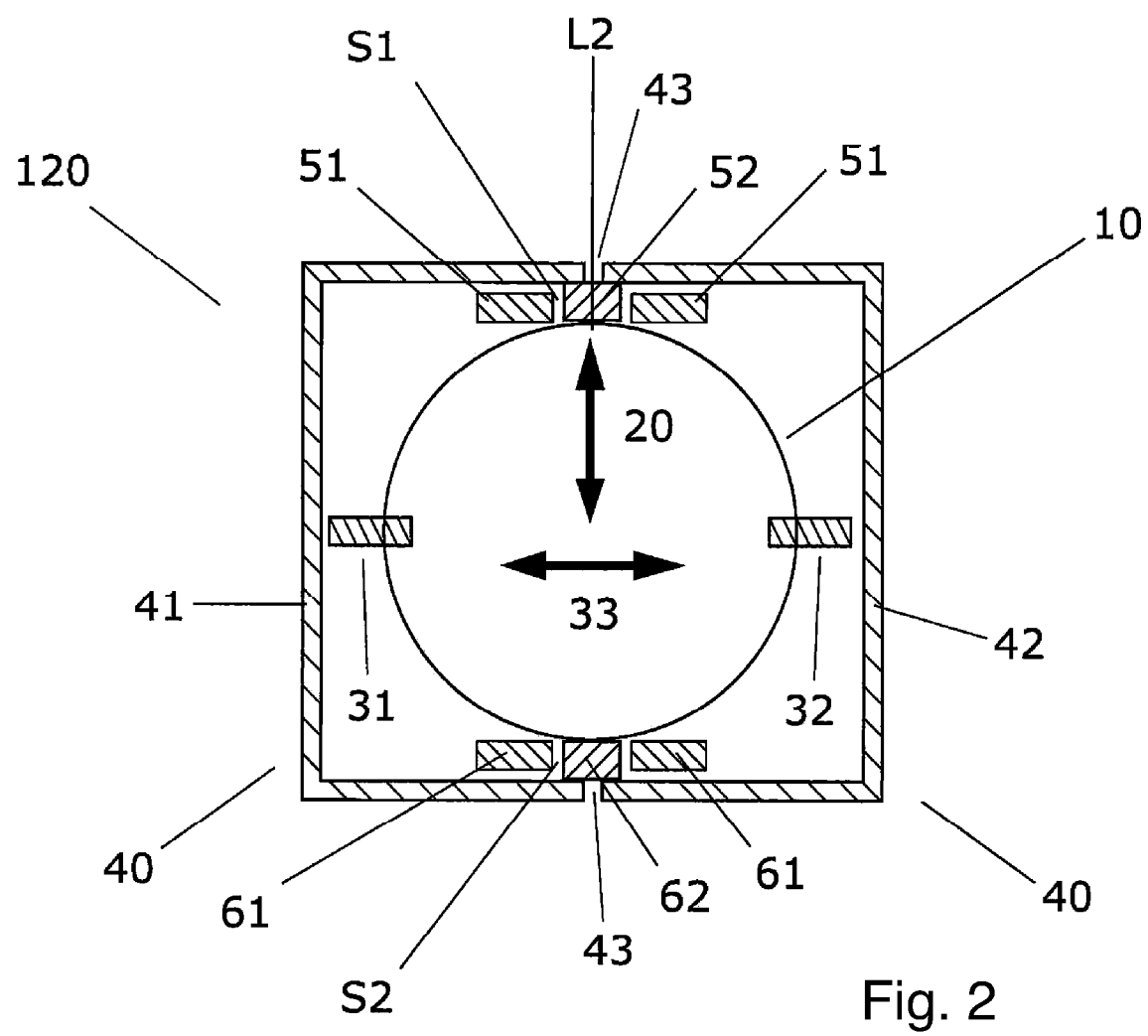
FIG. 2 shows a schematic cross section of a magneto inductive flow measuring device of the invention.

FIG. 2 shows a schematic cross section of a magneto inductive flow measuring device 120, which comprises: a measuring tube 10; and a magnet system having a first coil system S1 with a first coil 51 having a first coil core 52 and a second coil system S2 with a second coil 61 having a second coil core 62 for producing a magnetic field 20, which is essentially perpendicular to a measuring tube axis within the measuring tube;

two measuring electrodes 31, 32; and a field guide-back 40 having field guide-back sheet metal pieces 41 and 42. The magnetic field 20 produces in the medium flowing through the measuring tube 10 a flow dependent voltage 33, which is tapped by the measuring electrodes. The magnetic field 20 is led away from the measuring tube via the metal, field guide-back 40 between the first coil core 52 of the first coil 51 of the first coil system S1 and the second coil system S2. The field guide-back of the invention comprises two guide-back sheet metal pieces 41 and 42, which are separated from one another by an air gap 43. The guide-back sheet metal pieces 41, 42 lie, in such case, against a measuring tube far side of the first coil core 52 and against a measuring tube far side of the second coil core 62. The first coil core 52 and the second coil core 62 can be formed on the measuring tube facing sides as pole shoes. However, also separate pole shoes can be arranged between the coil cores and the measuring tube. The air gap between the guide-back sheet metal pieces 41, 42 has the result that after a change of the field strength and/or the orientation of the magnetic field the electrical voltage 33 induced in the medium adjusts faster to the changed magnetic field and settles to a new, essentially constant value. Thus, the frequency of state change of the magnetic field can be further increased, which has positive effects on the signal-noise ratio of the voltage tapped by the measuring electrodes 31, 32. Control of the first coil system S1 and the second coil system S2 and the evaluation of the voltage tapped by the measuring electrodes 31, 32 is performed by an electronic measuring/operating circuit, which is not shown in FIG. 2. A magneto inductive flow measuring device of the invention can also, for example, comprise only a first coil system, wherein the guide-back sheet metal pieces are connected with the measuring tube via a field guiding element on the measuring tube side lying opposite the first coil system S1.

Figure 3:
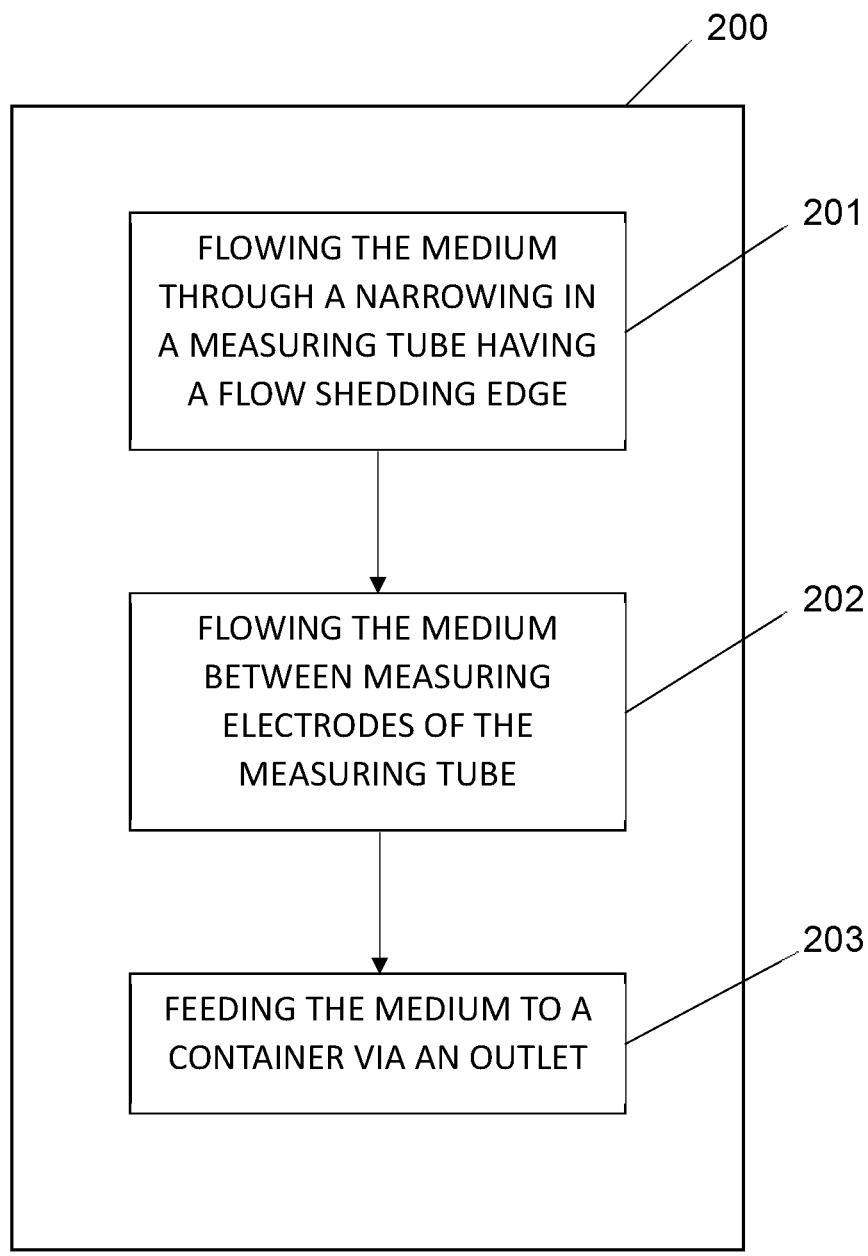
FIG. 3 shows a process flow diagram of the invention.

FIG. 3 shows the flow of a method 200 of the invention. In a first method step 201, the medium flowing through the measuring tube 10 is led through a narrowing, wherein at a flow shedding edge turbulences form in the medium and are shed, so that the flow profile is flattened. In a second method step 202, the medium is led with flattened flow profile to the measuring electrodes 31, 32 in the measuring tube 10. In a third method step 203, the medium after its having passed through the measuring tube 10 is fed via an outlet 130 having a valve 131 to a container 140.

Figure 4:
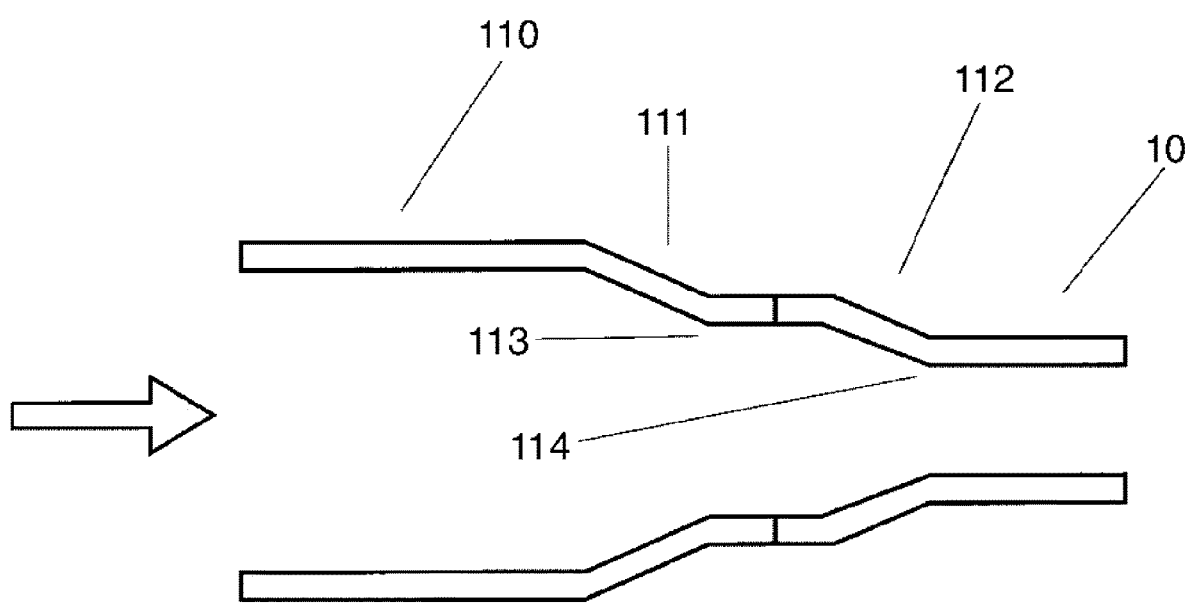
FIG. 4 shows a schematic, longitudinal section through the course of an arrangement of the invention including a pipeline and, connected to the pipeline, a measuring tube of a magneto inductive flow measuring device of the invention.

FIG. 4 is a schematic longitudinal section of an inlet region of an arrangement of the invention 100 with a pipeline 110 and a measuring tube 10 of a magneto inductive flow measuring device 120 of the invention connected to the pipeline 110. The course of the flow includes a first narrowing 111 in the pipeline 110 and a second narrowing 112 in the measuring tube 10, wherein the cross-sectional area of the pipeline 110, and of the measuring tube 10, is lessened first in the region of the first narrowing 111 and then further in the region of the second narrowing 112 downstream. A medium, which flows from the pipeline 110 to the flow measuring device 120, experiences an increase in flow velocity as a result of the first narrowing 111 and then another increase in flow velocity as a result of the second narrowing 112. In the case of sufficiently high flow velocity of the medium, flow vortices are produced on the flow shedding edges 113, 114. The first narrowing 111 and the second narrowing 112 have because of the production of the flow vortices a positive effect on the signal-noise ratio, especially the combination of the first narrowing 111 with the second narrowing 112 acts positively on the signal-noise ratio. The constrictions are, in such case, arranged on the upstream side of the flow measuring device.

The invention claimed is:

1. A method for measuring a flow velocity or a volume flow of a medium using a magneto-inductive flow measuring device, the method comprising:
leading the medium to a measuring tube of the flow measuring device via a pipeline, wherein the flow measuring device further includes at least a first coil system and two measuring electrodes coupled with the medium within the measuring tube;
producing a magnetic field using the at least first coil system such that the magnetic field extends substantially perpendicular to a first longitudinal axis of the measuring tube and induces a flow-dependent voltage in the medium;
at least partially leading the magnetic field away from the measuring tube between the first coil system and a side of the measuring tube opposite the first coil system using a field guide-back, which includes two guide-back sheet metal pieces disposed on opposing sides of the measuring tube, each adjacent a lateral side of the first coil core and separated from each other by an air gap, wherein the first coil core is adapted to at least partially lead the magnetic field between the measuring tube and the field guide-back;
registering the flow-dependent voltage using the two measuring electrodes; and
determining the flow velocity or the volume flow of the medium using the registered flow-dependent voltage,
wherein the pipeline has a first narrowing and/or the measuring tube has a second narrowing, which are/is arranged on an upstream side of the flow measuring device, and wherein the first narrowing and/or the second narrowing have/has a flow-shedding edge on a downstream side thereof, and wherein the medium is a liquid with an electrical conductivity of at most 20 µS/cm.

2. The method of claim 1, wherein the first narrowing decreases an inner cross-sectional area of the pipeline and/or the second narrowing decreases an inner cross-sectional area of the measuring tube by at least 10%.

3. The method of claim 1, wherein a ratio of volume flow, in milliliters per second (ml/s), to inner cross-sectional area of the pipeline, in square millimeters (mm$^2$), is greater than 0.05 ml/(s*mm^2) and less than 20 ml/(s*mm^2).

4. The method of claim 1, wherein the pipeline has a substantially round cross-section, and wherein a radius of the pipeline is greater than 2 mm and less than 50 mm.

5. The method of claim 1, wherein a path length in a direction of flow of the medium from a beginning of the first narrowing to the measuring electrodes is at most 40 times an inner diameter of the measuring tube in a region of the measuring electrodes.

6. The method of claim 1, wherein, while registering the flow-dependent voltage, a substantially constant magnetic field is produced for registering at least one voltage value for determining flow velocity or volume flow, wherein a polarity of the magnetic field is periodically switched, and a frequency of the polarity change of the magnetic field is greater than 80 Hz.

7. A magneto-inductive flow measuring device for measuring flow velocity or volume flow of a medium, the flow measuring device comprising:
a measuring tube having a first longitudinal axis;
a magnet system including a first coil system including at least a first coil having a first coil core, wherein the first coil system is arranged on the measuring tube and adapted to generate a magnetic field extending substantially perpendicular to the first longitudinal axis of the measuring tube;
two measuring electrodes arranged in the measuring tube and coupled with the medium, the measuring electrodes adapted to register a flow-dependent voltage induced in the medium by the magnetic field;
an electronic measuring/operating circuit configured to evaluate the flow-dependent voltage registered by the measuring electrodes; and
a field guide-back structured to at least partially lead the magnetic field away from the measuring tube between the first coil system and a side of the measuring tube opposite the first coil system, wherein the field guide-back includes two guide-back sheet metal pieces disposed on opposing sides of the measuring tube, each adjacent a lateral side of the first coil core, and separated from each other by an air gap, and wherein the first coil core is adapted to at least partially lead the magnetic field between the measuring tube and the field guide-back.

8. The magneto-inductive flow measuring device of claim 7, wherein the air gap is configured as to ensure a distance between the guide-back sheet metal pieces, wherein the guide-back sheet metal pieces have the same wall thickness, and wherein a ratio of the distance to the wall thickness of the guide-back sheet metal pieces is greater than 0.5.

9. The magneto-inductive flow measuring device of claim 7, wherein the guide-back sheet metal pieces are symmetric relative to a plane in which the first longitudinal axis extends.

10. The magneto-inductive flow measuring device of claim 7, wherein the at least first coil of the first coil system has a second longitudinal axis, and wherein the air gap intersects the second longitudinal axis.

11. The magneto-inductive flow measuring device of claim 7, further comprising:
a second coil system including at least a second coil having a second coil core, the second coil system disposed opposite the first coil system,
wherein the first coil system and the second coil system are adapted to generate the magnetic field such that the magnetic field extends substantially perpendicular to the first longitudinal axis of the measuring tube and substantially parallel with a second longitudinal axis of the first coil system, wherein the second coil core is adapted to at least partially lead the magnetic field between the measuring tube and the field guide-back and to increase a magnetic flux density of the magnetic field, and wherein the field guide-back is structured to at least partially lead the magnetic field away from the measuring tube between the first coil system and the second coil system.

12. The magneto-inductive flow measuring device of claim 7, wherein the electronic measuring/operating circuit is further configured to supply the first coil system with electrical current to generate, in a measuring phase, an essentially constant magnetic field for registering at least one voltage value for determining flow velocity or volume flow, and further configured to switch the magnetic field periodically between different polarities, wherein a frequency of change of polarity is greater than 80 Hz.

13. An arrangement for measuring flow velocity or volume flow of a medium in a measuring tube using a magneto-inductive flow measuring device, the arrangement comprising:
a pipeline; and
at least one magneto-inductive flow measuring device including:
a measuring tube having a first longitudinal axis;
a magnet system including a coil system adapted to produce a magnetic field extending substantially perpendicularly to the longitudinal axis of the measuring tube;
arranged in the measuring tube, at least two measuring electrodes, which are coupled with the medium and adapted to register a flow dependent voltage induced in the medium by the magnetic field; and
a field guide-back structured to at least partially lead the magnetic field away from the measuring tube between the first coil system and a side of the measuring tube opposite the first coil system, wherein the field guide-back includes two guide-back sheet metal pieces disposed on opposing sides of the measuring tube, each adjacent a lateral side of the first coil core and separated from each other by an air gap, and wherein the first coil core is adapted to at least partially lead the magnetic field between the measuring tube and the field guide-back;
an electronic measuring/operating circuit configured to evaluate the voltage registered by the at least two measuring electrodes, wherein the medium is led via the pipeline to the measuring tube of the magneto inductive measuring device, and
wherein the pipeline has a first narrowing and/or the measuring tube has a second narrowing, which are/is arranged on an upstream side of the flow measuring device, wherein the first narrowing and/or the second narrowing have/has a flow shedding edge on a downstream side thereof.

14. The arrangement of claim 13, wherein the first narrowing lessens an inner cross-sectional area of the pipeline and/or the second narrowing lessens an inner cross-sectional area of the measuring tube by at least 10%.

15. The arrangement of claim 13, wherein a path length in a direction of flow of the medium from a beginning of the first narrowing to the at least two measuring electrodes is at most 20 times an inner diameter of the measuring tube in a region of the measuring electrodes.

16. The arrangement of claim 13, wherein the electronic measuring/operating circuit is further configured to supply the coil system with electrical current to generate, in a measuring phase, an essentially constant magnetic field for registering at least one voltage value for determining flow velocity or volume flow, and further configured to switch the magnetic field periodically between different polarities, wherein a frequency of change of polarity is greater than 80 Hz.

17. The arrangement of claim 13, wherein the arrangement includes an outlet on the downstream side of the flow measuring device, wherein the medium flows via the outlet from the flow measuring device to a container.

18. The arrangement of claim 17, wherein the outlet has a valve adapted to control flow velocity or volume flow of the medium through the pipeline.

19. A filling plant, comprising:
an arrangement for measuring flow velocity or volume flow of a medium in a measuring tube using a magneto-inductive flow measuring device, the arrangement comprising:
a pipeline; and
at least one magneto-inductive flow measuring device including:
a measuring tube having a first longitudinal axis;
a magnet system including a coil system adapted to produce a magnetic field extending substantially perpendicularly to the longitudinal axis of the measuring tube;
arranged in the measuring tube, at least two measuring electrodes, which are coupled with the medium and adapted to register a flow dependent voltage induced in the medium by the magnetic field; and
a field guide-back structured to at least partially lead the magnetic field away from the measuring tube between the first coil system and a side of the measuring tube opposite the first coil system, wherein the field guide-back includes two guide-back sheet metal pieces disposed on opposing sides of the measuring tube, each adjacent a lateral side of the first coil core and separated from each other by an air gap, and wherein the first coil core is adapted to at least partially lead the magnetic field between the measuring tube and the field guide-back;
an electronic measuring/operating circuit configured to evaluate the voltage registered by the at least two measuring electrodes, wherein the medium is led via the pipeline to the measuring tube of the magneto inductive measuring device, and wherein the pipeline has a first narrowing and/or the measuring tube has a second narrowing, which are/is arranged on an upstream side of the flow measuring device, wherein the first narrowing and/or the second narrowing have/has a flow shedding edge on a downstream side thereof, and
wherein the filling plant is configured to provide a filling volume having a volume of at least 10 ml.

20. The filling plant of claim 19, wherein the filling volume is at most 10 liters.

21. The filling plant of claim 19, wherein a relative deviation of the filling volume from a desired filling volume is less than 1%.

* * * * *